United States Patent
Chang et al.

(10) Patent No.: US 10,295,861 B2
(45) Date of Patent: May 21, 2019

(54) FRAME ASSEMBLY HAVING HOOK STRUCTURE

(71) Applicant: Radiant Opto-Electronics Corporation, Kaohsiung (TW)

(72) Inventors: Jung-Yin Chang, Kaohsiung (TW); Yi-Jen Chiu, Kaohsiung (TW)

(73) Assignee: RADIANT OPTO-ELECTRONICS CORPORATION, Kaohsiung (TW)

( * ) Notice: Subject to any disclaimer, the term of this patent is extended or adjusted under 35 U.S.C. 154(b) by 388 days.

(21) Appl. No.: 14/709,476

(22) Filed: May 11, 2015

(65) Prior Publication Data
US 2016/0209697 A1    Jul. 21, 2016

(30) Foreign Application Priority Data

Jan. 19, 2015  (TW) .............................. 104101701 A (51) Int. Cl.
  *G02F 1/1333* (2006.01)
  *G02F 1/1335* (2006.01)
  *G02B 6/42* (2006.01)

(52) U.S. Cl.
  CPC ..... *G02F 1/133608* (2013.01); *G02B 6/4261* (2013.01); *G02F 1/133308* (2013.01); *G02F 2001/133314* (2013.01); *G02F 2001/133317* (2013.01); *G02F 2001/133328* (2013.01); *G02F 2201/465* (2013.01)

(58) Field of Classification Search
  CPC ... G02F 1/133308; G02F 2001/133314; G02F 2001/133317; G02F 2001/133328; G02F 1/133608; G02F 2201/465; G02B 6/4201; G02B 6/4256; G02B 6/4261
  See application file for complete search history.

(56) References Cited

U.S. PATENT DOCUMENTS

| | | | | |
|---|---|---|---|---|
| 8,687,138 | B2 * | 4/2014 | Lee | G09F 9/35 345/905 |
| 2014/0063412 | A1 * | 3/2014 | Zhou | G02B 6/0088 349/65 |

FOREIGN PATENT DOCUMENTS

| | | |
|---|---|---|
| CN | 1540405 A | 10/2004 |
| CN | 101150942 A | 3/2008 |
| CN | 101832496 A | 9/2010 |
| CN | 102853347 A | 1/2013 |
| CN | 102495497 B | 4/2014 |
| CN | 103792696 A | 5/2014 |
| CN | 204479882 U | 7/2015 |
| KR | 20130087341 A | 8/2013 |
| TW | M48760202 | 10/2014 |

* cited by examiner

*Primary Examiner* — Paisley L Arendt
(74) *Attorney, Agent, or Firm* — CKC & Partners Co., LLC (57) ABSTRACT

A frame assembly includes a frame body and an outer frame. The frame body includes at least one side portion and at least one set of hook structure disposed on the side portion. The hook structure includes a first hook and a second hook. The first hook has a first opening. The second hook has a second opening, and a direction of the second opening is different from a direction of the first opening. The outer frame includes at least one frame unit and at least one fixing structure disposed on the frame unit. The frame unit is corresponding to the side portion of the frame body. The fixing structure is corresponding to the hook structure, and the first hook and the second hook of the hook structure are engaged with the corresponded fixing structure.

18 Claims, 10 Drawing Sheets

FRAME ASSEMBLY HAVING HOOK STRUCTURE

RELATED APPLICATIONS

This application claims priority to Taiwan Application Serial Number 104101701, filed Jan. 19, 2015, which is herein incorporated by reference.

BACKGROUND

Field of Invention

The present invention relates to a frame assembly. More particularly, the present invention relates to a frame assembly which can be applied to a light source module.

Description of Related Art

A liquid crystal display mainly includes a backlight module, a liquid crystal display panel and an outer frame. Moreover, a mold frame for carrying the liquid crystal display panel is disposed on the backlight module. After the liquid crystal display panel is disposed on the mold frame, the outer frame is used to fix the mold frame, the liquid crystal display panel and the backlight module, so as to finish assembly of the liquid crystal display.

A common method for fixing the outer frame can be such as locking by screws, adhering by tapes, or a common engagement method. However, the aforementioned methods may have many shortcomings. For example, the method of locking by screws may damage the structure of the outer frame and affect its appearance. It is not easy to perform assembling and reworking the outer frame by using the method of adhering by tapes. Moreover, the common engagement method may cause poor structural robustness, and the outer frame is likely to be loosened.

SUMMARY

The invention provides a frame assembly which can be easily assembled with better robustness.

According to the aforementioned object, a frame assembly is provided. The frame assembly includes a frame body and an outer frame. The frame body includes at least one side portion and at least one set of hook structure disposed on the side portion. The hook structure includes a first hook and a second hook. The first hook has a first opening. The second hook has a second opening, and a direction of the second opening is different from a direction of the first opening. The outer frame includes at least one frame unit and at least one fixing structure disposed on the frame unit. The frame unit is corresponding to the side portion of the frame body. The fixing structure is corresponding to the hook structure, and the first hook and the second hook of the hook structure are engaged with the corresponded fixing structure.

According to an embodiment of the present invention, each of the first hook and the second hook is an L-shaped structure protruding from the side portion, and the fixing structure is a convex structure protruding from an inner side of the outer frame.

According to an embodiment of the present invention, the fixing structure has a first surface and a second surface. The first hook and the second hook are respectively connected with first surface and the second surface of the corresponded fixing structure.

According to an embodiment of the present invention, the outer frame is an integrally-formed structure.

According to an embodiment of the present invention, the outer frame includes plural frame units correspondingly disposed on the at least one side portion of the frame.

According to an embodiment of the present invention, the outer frame includes at least one connecting member which can combine any of the two adjacent frame units.

According to an embodiment of the present invention, at least one end of each of the frame units is implemented with a positioning post, the connecting member has two positioning holes, and the connecting member is positioned by limiting the two positioning holes respectively on the positioning post of any of the two adjacent frame units.

According to an embodiment of the present invention, each of the positioning holes has a neck portion, and each of the positioning posts has a shank which is inserted into the corresponded positioning hole from the neck portion thereof.

According to an embodiment of the present invention, each of the positioning posts further has a head which is combined with the shank, and the connecting member is limited between the head of the positioning post and the frame unit.

According to an embodiment of the present invention, the connecting member is made of spring steel.

According to an embodiment of the present invention, the connecting member has two intersected walls with an included angle which is smaller than 90 degrees.

According to an embodiment of the present invention, the frame body is made of plastic, and the outer frame is made of metal.

According to an embodiment of the present invention, the outer frame is an aluminum extrusion structure.

According to an embodiment of the present invention, another frame assembly is provided. The frame assembly includes a frame body and an outer frame. The frame body includes at least one side portion and at least one fixing structure. The fixing structure is disposed on the side portion. The outer frame includes at least one frame unit and at least one set of hook structure disposed on the frame unit. The frame unit is corresponding to the side portion of the frame body, and the hook structure is corresponding to the fixing structure of the frame body. The hook structure includes a first hook and a second hook. The first hook has a first opening. The second hook has a second opening. A direction of the second opening is different from a direction of the first opening, and the first hook and the second hook are engaged with the corresponded fixing structure.

According to an embodiment of the present invention, another frame assembly is provided. The frame assembly includes a frame body, an outer frame and a connecting unit. The frame body includes at least one side portion. The outer frame includes at least one frame unit corresponding to the side portion of the frame. The connecting unit includes at least one set of hook structure and at least one fixing structure. The hook structure is disposed on one of the side portion of the frame body and the outer frame, and the fixing structure is disposed on the other one of the side portion of the frame body and the outer frame. The hook structure includes a first hook and a second hook which are respectively connected with a first surface and a second surface of the fixing structure, and the first surface is different from the second surface.

According to an embodiment of the present invention, the side portion of the frame body extends along a first direction, and the first surface is spaced from the second surface along a second direction at an interval, in which the second direction is perpendicular to the first direction.

According to an embodiment of the present invention, the first hook has a first opening, the second hook has a second opening, and a direction of the second opening is different from a direction of the first opening.

According to the above embodiments, the frame body and the outer frame are combined together by using the first hook and the second hook, in which the first hook and the second hook have openings with different directions and both can be engaged with the fixing structure, thus increasing the robustness of assembly between the outer frame and the frame body. In addition, while being assembled, the frame body and the outer frame can be rapidly combined together by sliding the fixing structure into the openings from a side of the first hook or a side of the second hook to fix the fixing structure within the first hook and the second hook, thereby achieving the purpose of rapidly assembling the frame body with the outer frame.

On the other hand, the two adjacent frame units of the outer frame are combined together via the connecting member. Accordingly, the elastic force of the connecting member itself can be used to exert a pulling force on the two adjacent frame units, thereby enabling the two adjacent frame units to be tightly combined, further making the outer frame have better appealing appearance.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 1A:
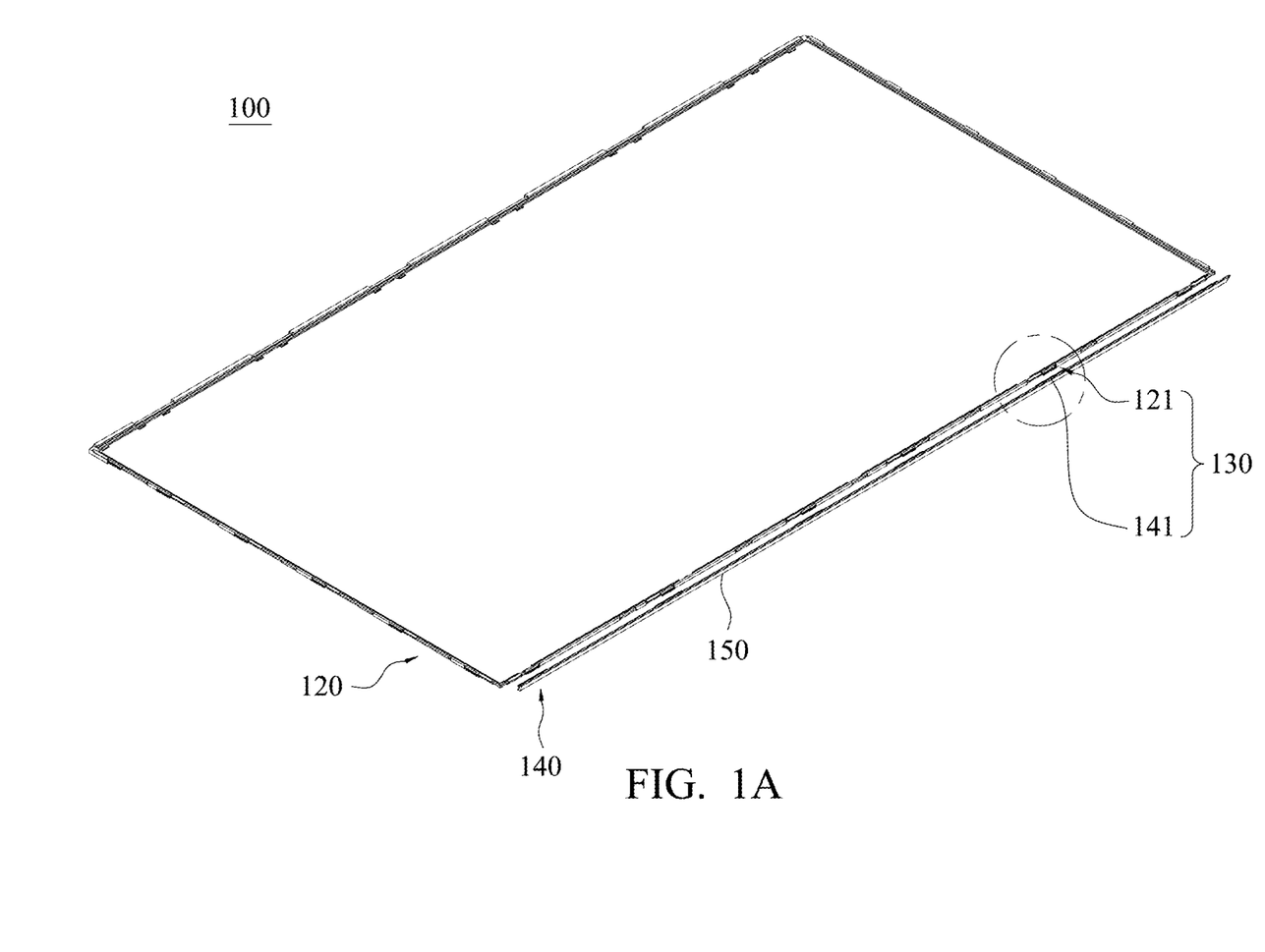
FIG. 1A is a schematic exploded view showing a frame assembly in accordance with a first embodiment of the present invention.
Figure 1B:
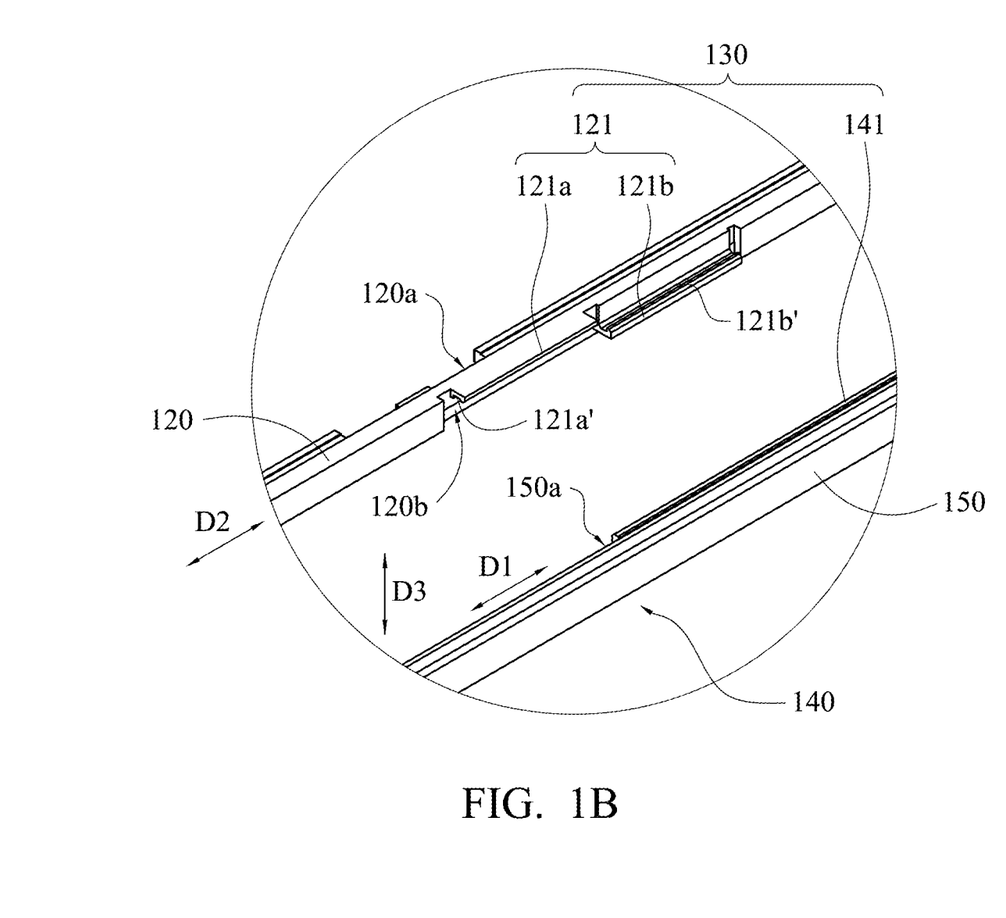
FIG. 1B is a schematic partial structural diagram of FIG. 1A.

Simultaneously referring to FIG. 1A and FIG. 1B, FIG. 1A is a schematic exploded view showing a frame assembly 100 in accordance with a first embodiment of the present invention, FIG. 1B is a schematic partial structural diagram of FIG. 1A. The frame assembly 100 of the present embodiment is can be disposed on a back plate of a backlight module as an appearance member. As shown in FIG. 1A and FIG. 1B, the frame assembly 100 mainly includes a frame body 120, a connecting unit 130 and an outer frame 140. The outer frame 140 can be disposed on the frame body 120 via the connecting unit 130. In the present embodiment, the connecting unit 130 includes at least one set of hook structure 121 and at least one fixing structure 141 corresponding to the hook structure 121. The frame body 120 is disposed on the back plate. As shown in FIG. 1B, the frame body 120 has an inner surface 120a and an outer surface 120b, and the hook structure 121 is disposed on the outer surface 120b of the frame body 120.

Referring to FIG. 1A and FIG. 1B again, the hook structure 121 includes a first hook 121a and a second hook 121b adjacent to the first hook 121a. In one embodiment, each of the first hook 121a and the second hook 121b is an L-shaped structure protruding from the outer surface 120b. Moreover, the first hook 121a has a first opening 121a', and the second hook 121b has a second opening 121b'. In the present embodiment, a direction of the first opening 121a' is different from that of the second opening 121b'. In one embodiment, the first opening 121a' and the second opening 121b' are staggered to each other and face opposite directions. For example, the first opening 121a' faces downwards, and the second opening 121b' faces upwards.

Figure 2:
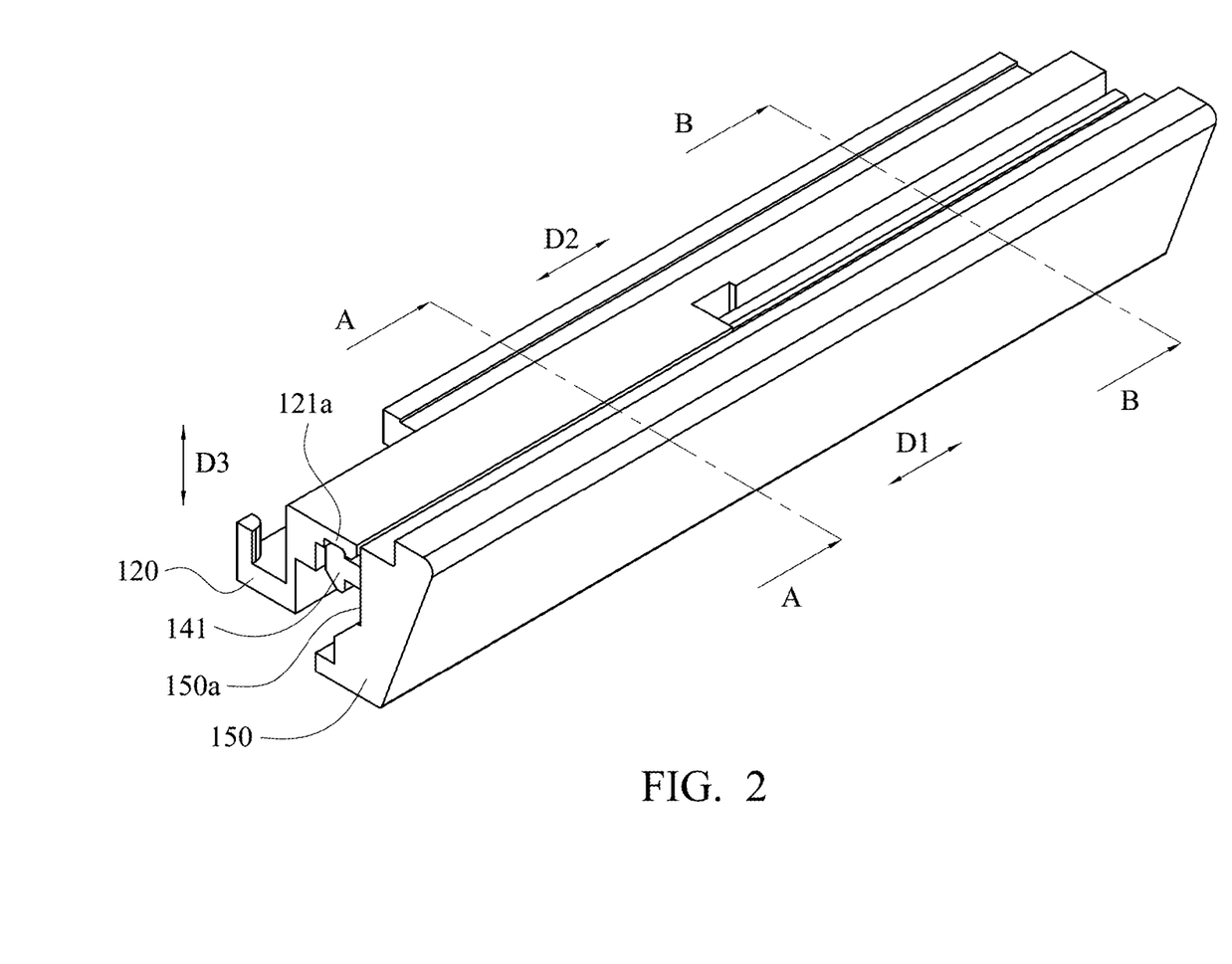
FIG. 2 is a schematic structural diagram showing the frame assembly in accordance with the first embodiment of the present invention.
Figure 3A:
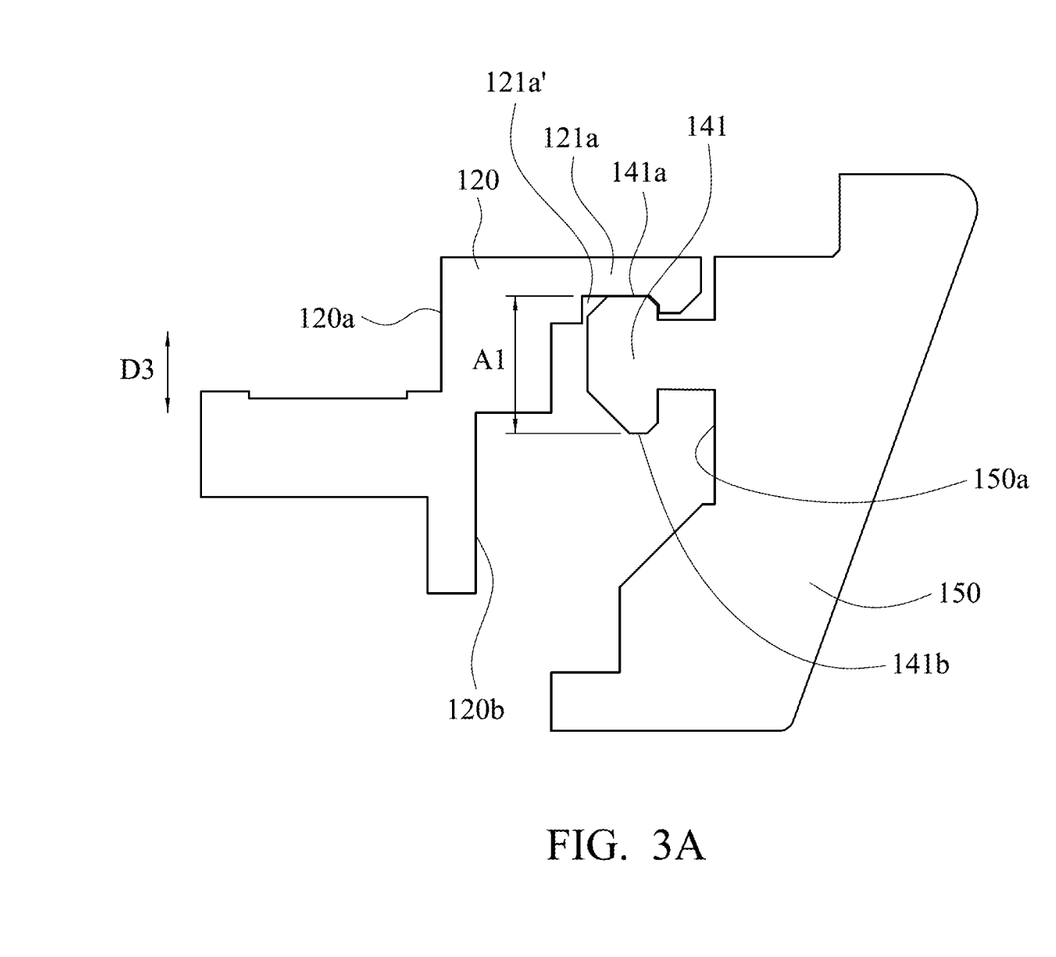
FIG. 3A is a schematic cross-sectional diagram viewed along a line A-A in FIG. 2.
Figure 3B:
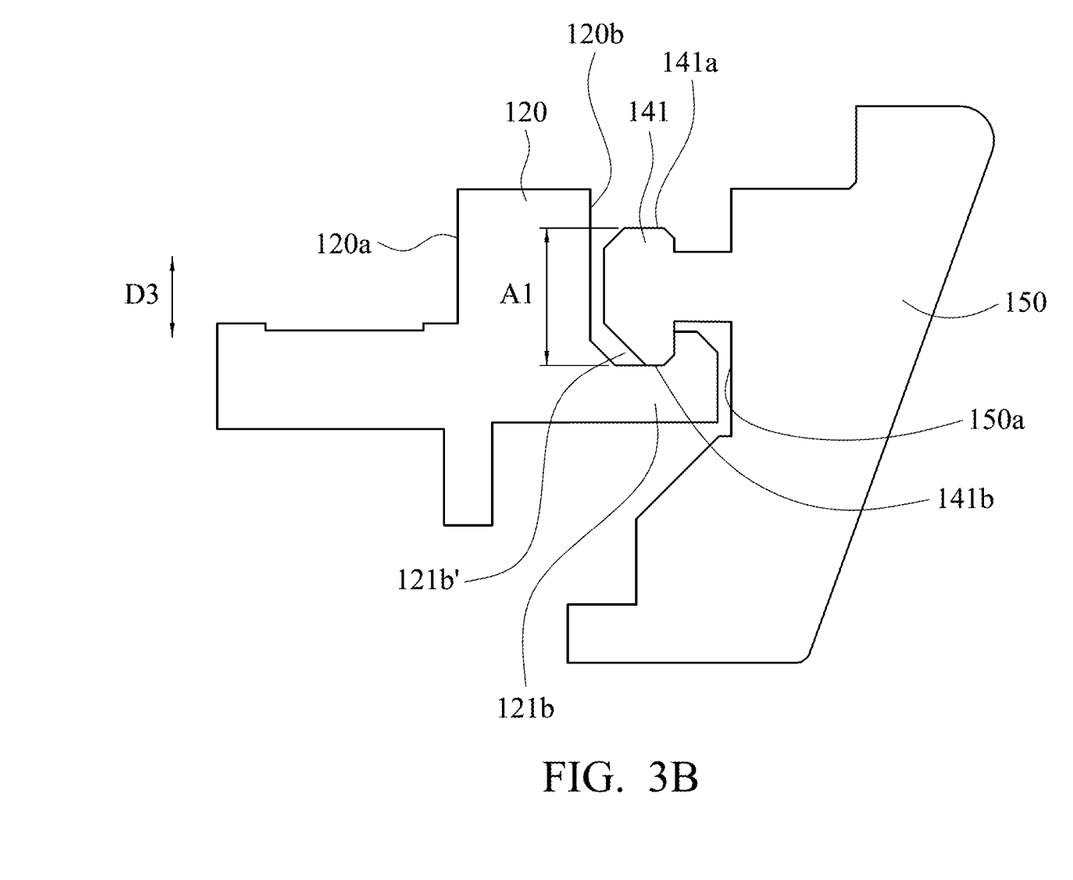
FIG. 3B is a schematic cross-sectional diagram viewed along a line B-B in FIG. 2.

As shown in FIG. 1A and FIG. 1B, the frame body 140 includes at least one frame unit 150. The fixing structure 141 is disposed on a position of the frame unit 150 corresponding to the hook structure 121. Moreover, the hook structure 121 is a convex structure protruding from an inside surface 150a of the frame unit 150. Referring to FIG. 2, FIG. 3A and FIG. 3B, FIG. 2 is a schematic structural diagram showing the frame assembly 100 in accordance with the first embodiment of the present invention, FIG. 3A and FIG. 3B are schematic cross-sectional diagrams respectively viewed along a line A-A and a line B-B in FIG. 2. The fixing structure 141 is an elongated convex structure, and an extending direction D1 of the elongated convex structure and an extending direction D2 of the first opening 121a' and the second opening 121b' are the same. Moreover, the extending direction D1 and the extending direction D2 are referred to as a first direction. Therefore, the fixing structure 141 can be slid into the first opening 121a' and the second opening 121b' from a side of the hook structure 121 along the first direction, i.e. the extending direction D1 and the extending direction D2, so as to assemble the frame body 120 and the outer frame 140 rapidly.

In addition, as shown in FIG. 2, FIG. 3A and FIG. 3B, the fixing member 141 is a mushroom-like shape in the side view and has opposite first surface 141a and a second surface 141b. As shown in FIG. 2, the first hook 121a and the second hook 121b of the hook structure 141 are both engaged with the corresponded fixing structure 141. Accordingly, when the hook structure 121 is engaged with the corresponded fixing structure 141, the first hook 121a is connected with the first surface 141a (as shown in FIG. 3A), and the second hook 121b is connected with the second surface 141b (as shown in FIG. 3B). In other words, the first hook 121a and the second hook 121b are alternately engaged with the same fixing structure 141, thus increasing the robustness of the hook structure 121 combined with the fixing structure 141. In some embodiments, the first surface 141a is different from the second surface 141b. In other embodiments, as shown in FIG. 3A and FIG. 3B, the first surface 141a is spaced from the second surface 141b along an extending direction D3 at an interval A1. The extending direction D3 can be referred to as a second direction which is vertical to the first direction (i.e. the first extending direction D1 and the second extending direction D2).

Referring to FIG. 2, FIG. 3A and FIG. 3B again, in some embodiments, the frame 120 can be made of plastic, and the frame unit 140 can be made of metal. In an example, the frame unit 150 is an aluminum extrusion structure. Therefore, when the outer frame 150 is being disposed on the frame body 120, the hook structure 121 can be engaged with the corresponded fixing structure 141 by using its elasticity. It is noted that the materials of the frame unit 150 and the outer frame 140 described above are merely used as an example for explanation, and embodiments of the present invention are not limited thereto. In other embodiments, the frame unit 150 and the outer frame 140 can be respectively made of different materials other than the materials described in previous embodiments.

Figure 4A:
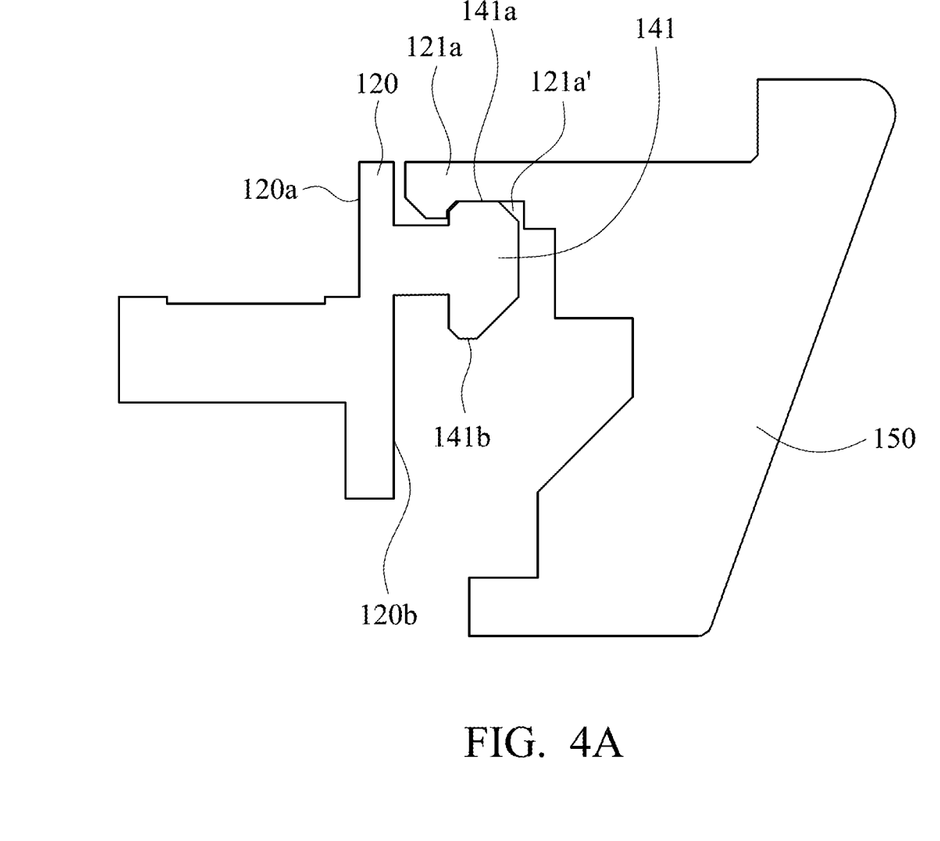
FIG. 4A and FIG. 4B are schematic structural diagrams showing a frame assembly in accordance with a second embodiment of the present invention.
Figure 4B:
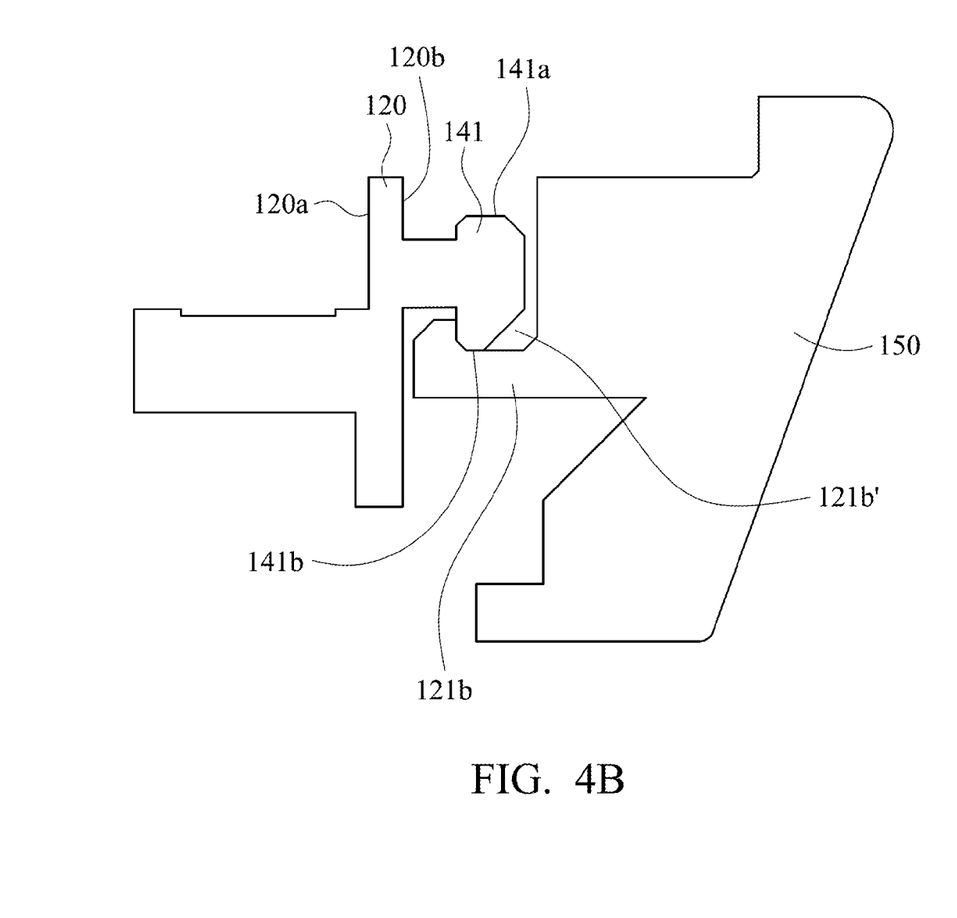

It is noted that, the embodiment shown in FIG. 3A and FIG. 3B showing that the first hook 121a and the second hook 121b which are disposed on the frame body 120, and the fixing structure 141 which is disposed on the frame unit 140, is merely used as an example for explanation, and embodiments of the present invention are not limited thereto. Referring to FIG. 4A and FIG. 4B, FIG. 4A and FIG. 4B are schematic structural diagrams showing a frame assembly in accordance with a second embodiment of the present invention. In other embodiments, the first hook 121a and the second hook 121b can be also disposed on the frame unit 150, and the fixing structure 141 can be disposed on the frame body 120. Similarly, the first hook 121a and the second hook 121b can be alternately engaged with the same fixing structure 141 to achieve the same object as described above, and will not be described again herein.

Figure 5:
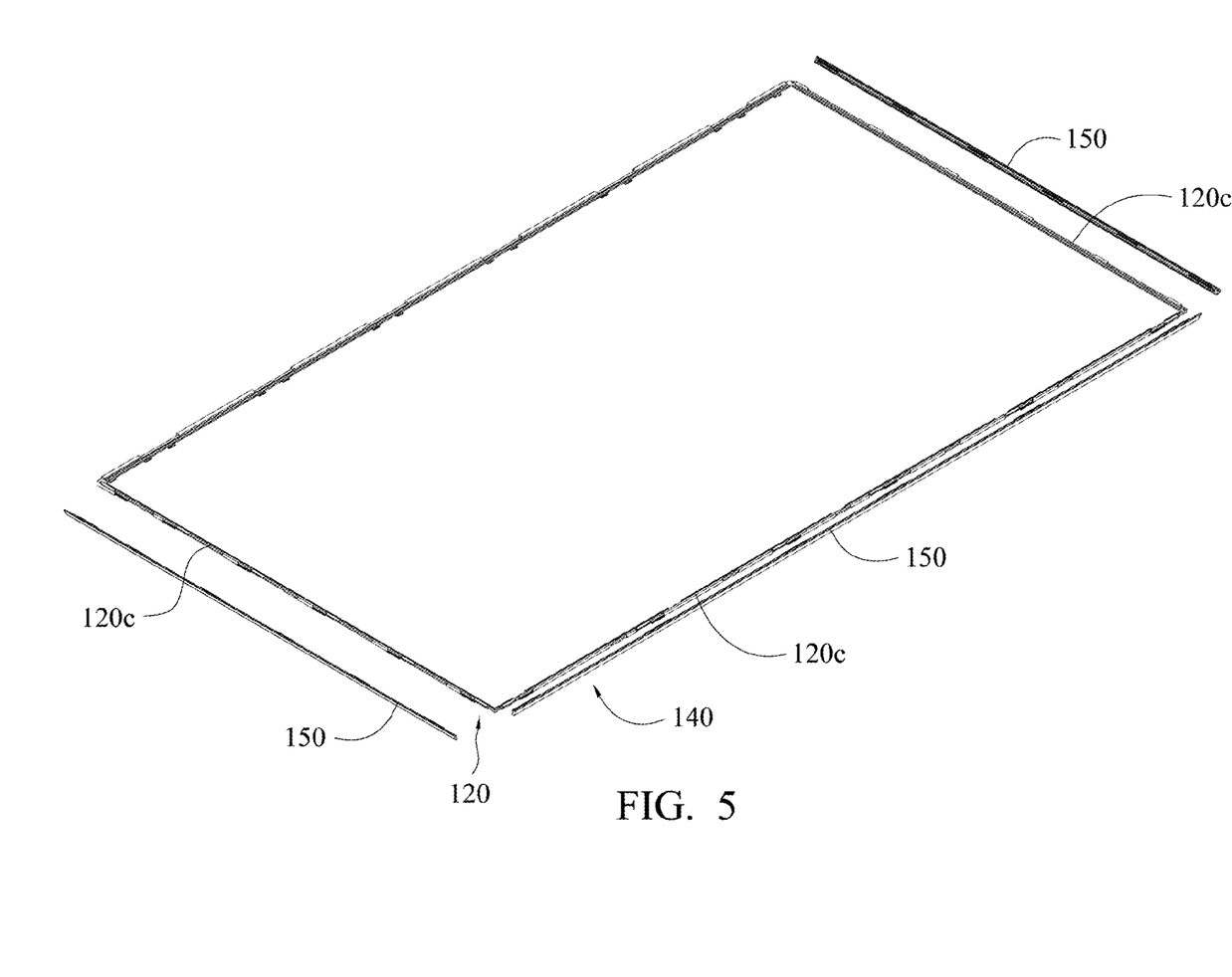
FIG. 5 is a schematic exploded view showing a frame assembly in accordance with a third embodiment of the present invention.
Figure 6A:
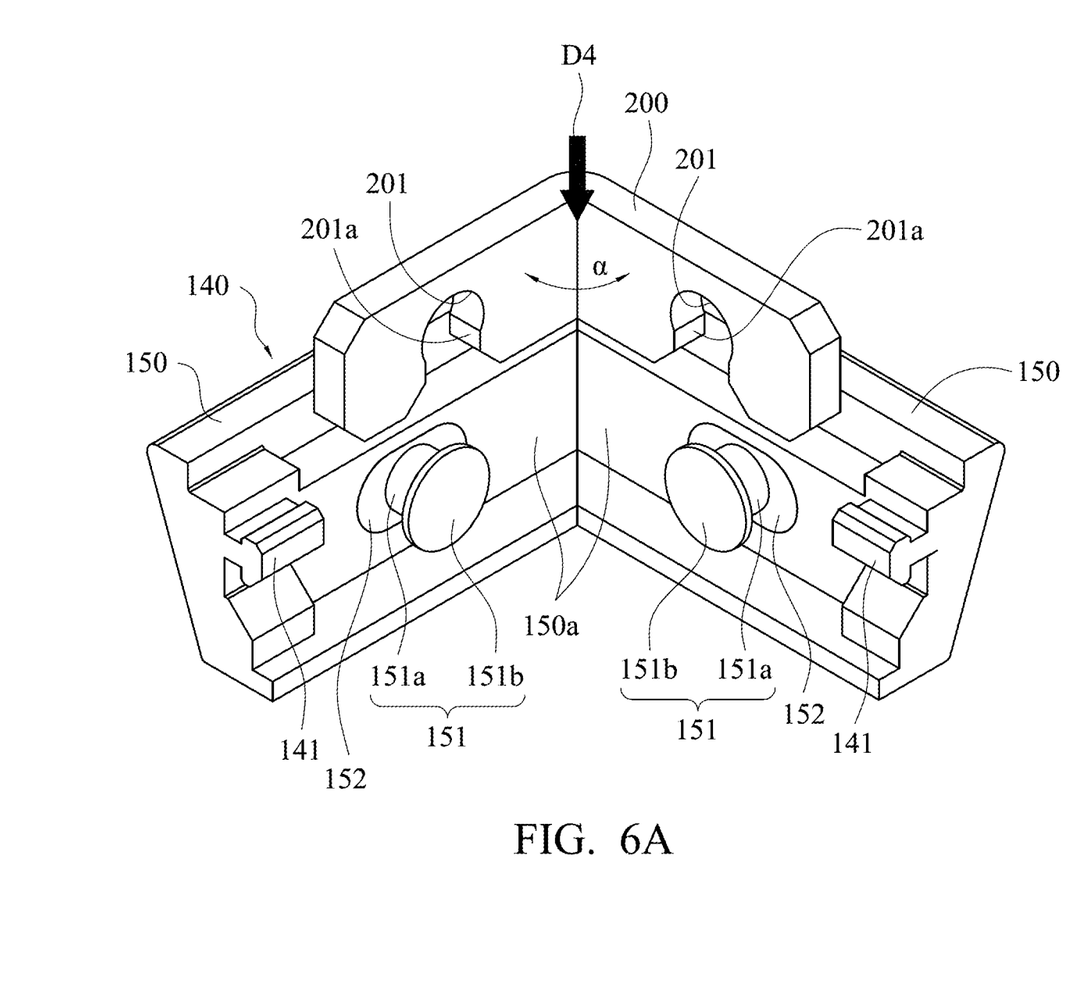
FIG. 6A is a schematic exploded view showing a connecting member and two frame units in accordance with the third embodiment of the present invention.

Referring to FIG. 5 and FIG. 6A, FIG. 6A is a schematic exploded view showing a connecting member 200 and two frame units 150 in accordance with the third embodiment of the present invention. In one embodiment, the frame body 120 includes plural side portions 120c, and the outer frame 140 includes plural frame units 150 disposed on the at least one side portions 120c of the frame body 120. In one example, the frame units 150 are correspondingly disposed on the each side portion 120c. In other examples, several frame units 150 can be simultaneously disposed on one frame portion 120c at the same time. In one embodiment, the number of the frame units 150 is three, and the frame units 150 are respectively disposed on three side portions 120c of the frame body 120 which are not adjacent to a light source. In one embodiment, each of the frame units 150 is elongated. In other embodiments, as shown in FIG. 6A, the two adjacent frame units 150 are combined together via the connecting member 200.

Referring to FIG. 6A, in some embodiments, in each frame unit 150, a positioning post 151 is disposed on at least one end of the frame unit 150. In some embodiments, the positioning post 151 is a convex structure protruding from the inner side 150a of the frame unit 150. In other embodiments, the positioning post 151 is a screw screwed on the inner side 150a of the frame unit 150. Moreover, before the screw is screwed on the inner side 150a of the frame unit 150, a nut 152 with internal thread can be embedded into the inner side 150a for allowing the screw to be stably fixed therein. It is noted that when being fixed on the frame unit 150, the screw and the nut 152 used in the present embodiment do not penetrate through the frame unit 150, and thus an outer surface of the frame unit 150 can be kept as a flat surface.

As shown in FIG. 6A, the connecting member 200 has two positioning holes 201. Therefore, the connecting member 200 can be positioned by limiting the two positioning holes 201 respectively on the positioning post 151 of any of the two adjacent frame units 150, so as to connect the two adjacent frame units 150. In the present embodiment, the positioning hole 201 is a notch with a neck portion 201a, and the positioning post 151 includes a shank 151a and a head 151b combined with the shank 151a. Moreover, the connecting member 200 is made of spring steel or another material with elasticity. Therefore, while the connecting member 200 is being assembled with the frame unit 150 along a direction D4, the shank 151a is inserted into the corresponded positioning hole 201 from the neck portion 201a and the neck portion 201a is first expanded when passing through shank 151a of the positioning post 151, and then the connecting member 200 is elastically recovered to clamp the positioning post 151, so that the connecting member 200 can be limited between the head 151b of the positioning post 151 and the frame unit 150.

Figure 6B:
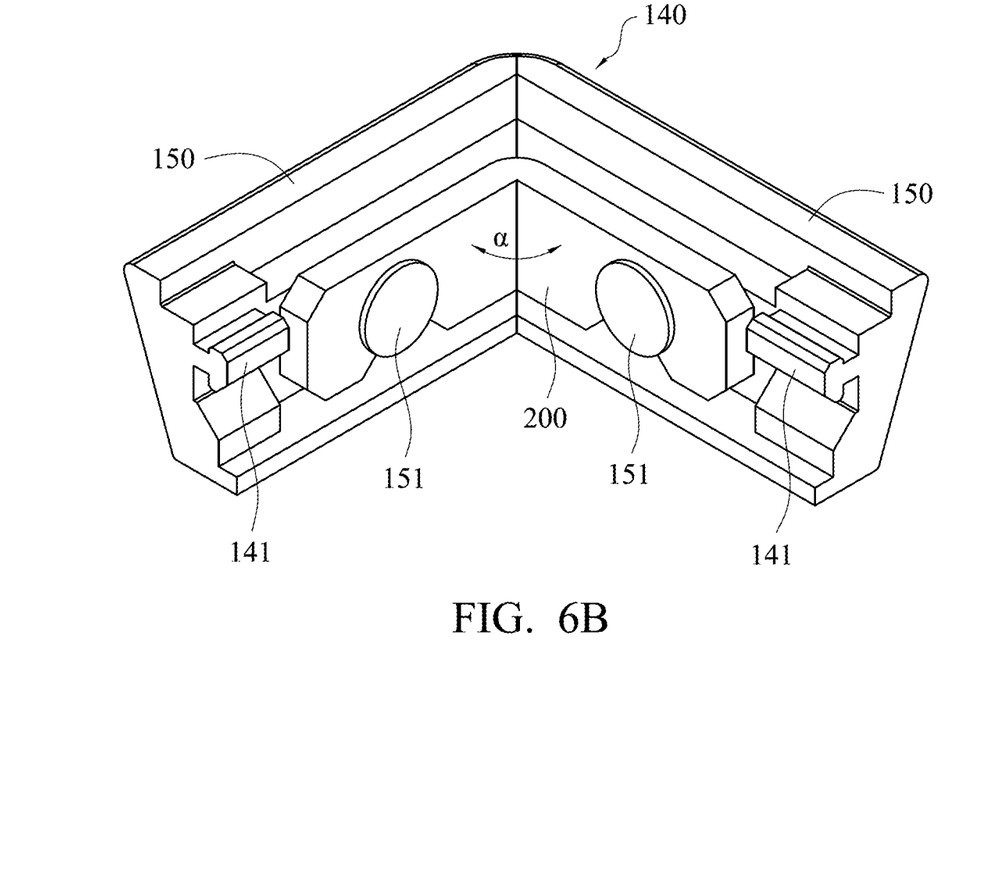
FIG. 6B is a schematic exploded view showing the connecting member and the frame units in accordance with the third embodiment of the present invention.

Referring to FIG. 6B, FIG. 6B is a schematic exploded view showing the connecting member 200 and the frame units 150 in accordance with the third embodiment of the present invention. In one embodiment, the connecting member 200 has two intersected walls with an included angle α which is smaller than 90 degrees. Because an angle between the two adjacent frame units 150 is equal to about 90 degrees, when the connecting member 200 with the included angle α smaller than 90 degrees is mounted on the positioning member 151, the connecting member 200 is expanded to about 90 degrees by the positioning member 151, and the two adjacent frame units 150 are pulled closer to each other by elastic recovery force from the connecting member 200 itself, thereby tightly combining the two adjacent frame units 150.

It is noted that the number of the frame units 150 is merely used as an example for explanation, and other embodiments of the present invention are not limited thereto. In other embodiments, the number of the frame unit 150 of the outer frame 140 and the connecting member 200 can be varied according to the practical requirements. In some embodiments, the outer frame 140 is an integrally-formed structure without using the connecting member 200.

According to the aforementioned embodiments of the present invention, the frame body and the outer frame are combined together by using the first hook and the second hook, in which the first hook and the second hook have openings with different directions and can be both engaged with the fixing structure, thus increasing the robustness of assembly between the outer frame and the frame body. In addition, while being assembled, the frame body and the outer frame can be rapidly combined together by sliding the fixing structure into the openings from a side of the first hook or a side of the second hook to fix the fixing structure within the first hook and the second hook, thereby achieving the purpose of rapidly assembling the frame body with the outer frame.

On the other hand, the two adjacent frame units of the outer frame are combined together via the connecting member. Accordingly, the elastic force of the connecting member itself can be used to exert a pulling force on the two adjacent frame units, thereby enabling the two adjacent frame units to be tightly combined, further making the outer frame have better appealing appearance.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A frame assembly, comprising:
    a frame body comprising at least one side portion and at least one set of hook structure disposed on the at least one side portion, wherein each of the at least one side portion has a length that extends along a first direction, an inner surface, and an outer surface opposite the inner surface, and wherein each of the at least one set of hook structure comprises:
        a first hook having a first opening, wherein the first hook comprises a first section that extends outwardly from the outer surface of the at least one side portion and a hook section that extends downwardly from a distal end of the first section in a second direction that is vertical to the first direction; and
        a second hook having a second opening, wherein a direction of the second opening is different from a direction of the first opening, wherein the second hook comprises a first section that extends outwardly from the outer surface of the at least one side portion and a hook section that extends upwardly from a distal end of the first section in the second direction; and
    an outer frame comprising at least one frame unit and at least one fixing structure disposed on the at least one frame unit, wherein the at least one frame unit has a length that extends along the first direction, and wherein the first hook and the second hook of the at least one hook structure are engaged with the at least one fixing structure at the same time;
    wherein both the first section of the first hook and the first section of the second hook extend from the outer surface of a same one of the at least one side portion along the same direction which extends towards a same one of the at least one fixing structure, and the at least one fixing structure is a convex structure extending from an inner side of the outer frame towards the first hook and the second hook.

2. The frame assembly of claim 1, wherein each of the first hook and the second hook is an L-shaped structure protruding from the at least one side portion.

3. The frame assembly of claim 2, wherein the at least one fixing structure has a first surface and a second surface, and the first hook and the second hook are respectively connected with first surface and the second surface of the at least one fixing structure.

4. The frame assembly of claim 1, wherein the at least one fixing structure of the outer frame is an elongated convex structure that has a length that extends along the first direction.

5. The frame assembly of claim 4, wherein the at least one fixing structure of the outer frame has a first surface and a second surface that are spaced apart along the second direction, a portion of the first surface of the outer frame being disposed in the first opening of the first hook, and a portion of the second surface of outer frame being disposed in the second opening of the second hook.

6. The frame assembly of claim 1, wherein the outer frame is an integrally-formed structure.

7. The frame assembly of claim 1, wherein the frame body is made of plastic, and the outer frame is made of metal.

8. The frame assembly of claim 1, wherein the outer frame is an aluminum extrusion structure.

9. The frame assembly of claim 1, wherein the outer frame comprises a plurality of frame units correspondingly disposed on the at least one side portion of the frame body.

10. The frame assembly of claim 9, wherein the outer frame comprises at least one connecting member which can combine any of two adjacent frame units of the plurality of frame units.

11. The frame assembly of claim 10, wherein at least one end of each of the frame units is implemented with a positioning post, the at least one connecting member has two positioning holes, and the at least one connecting member is positioned by limiting the two positioning holes respectively on the positioning post of any of the two adjacent frame units.

12. The frame assembly of claim 11, wherein each of the positioning holes has a neck portion, and the positioning post has a shank which is inserted into the positioning hole from the neck portion thereof.

13. The frame assembly of claim 12, wherein the positioning post further has a head which is combined with the shank, and the at least one connecting member is limited between the head of the positioning post and the corresponding frame unit.

14. The frame assembly of claim 11, wherein the at least one connecting member is made of spring steel.

15. The frame assembly of claim 10, wherein the at least one connecting member has two intersected walls with an included angle which is smaller than 90 degrees.

16. A frame assembly, comprising:
    a frame body comprising at least one side portion, wherein the at least one side portion has a length that extends along a first direction;
    an outer frame comprising at least one frame unit corresponding to the at least one side portion of the frame body, wherein the at least one frame unit has a length that extends along the first direction; and
    a connecting unit comprising at least one set of hook structure and at least one fixing structure, wherein the at least one set of hook structure is disposed on one of the at least one side portion of the frame body and the outer frame, and the at least one fixing structure is disposed on the other one of the at least one side portion of the frame body and the outer frame;
    wherein each of the at least one set of hook structure comprises a first hook and a second hook which are respectively connected with a first surface and a second surface of a same one of the at least one fixing structure, and the first surface is different from the second surface;
    wherein the first hook comprises a first section that extends outwardly from one of the at least one side portion of the frame body and the outer frame and a hook section that extends downwardly from a distal end of the first section in a second direction that is vertical to the first direction;

wherein the second hook comprises a first section that extends outwardly from one of the at least one side portion of the frame body and the outer frame and a hook section that extends upwardly from a distal end of the first section in the second direction;

wherein both the first section of the first hook and the first section of the second hook extend from a same one of the at least one side portion of the frame body or the outer frame along the same direction which extends towards the same one of the at least one fixing structure, and the at least one fixing structure is a convex structure extending from the other one of the at least one side portion of the frame body and the outer frame towards the first hook and the second hook.

17. The frame assembly of claim 16, wherein the at least one side portion of the frame body extends along the first direction, and the first surface is spaced from the second surface along the second direction at an interval, in which the second direction is perpendicular to the first direction.

18. The frame assembly of claim 16, wherein the first hook has a first opening, the second hook has a second opening, and a direction of the second opening is different from a direction of the first opening.

\* \* \* \* \*